March 10, 1959 K. W. BENHAM 2,876,874
PILASTER STRUCTURE AND HINGE BRACKET ASSEMBLY
Filed Nov. 15, 1957 5 Sheets-Sheet 1
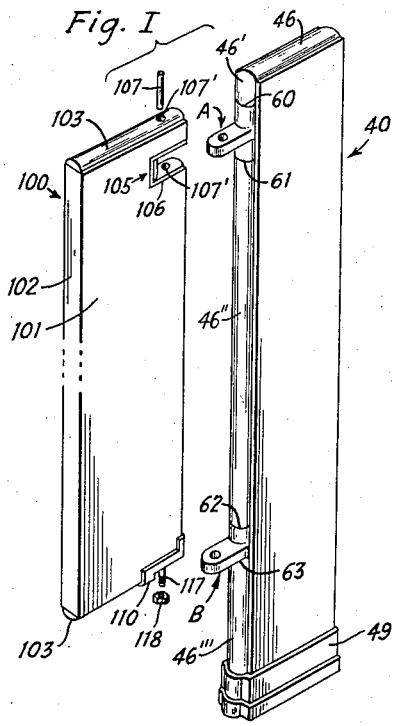
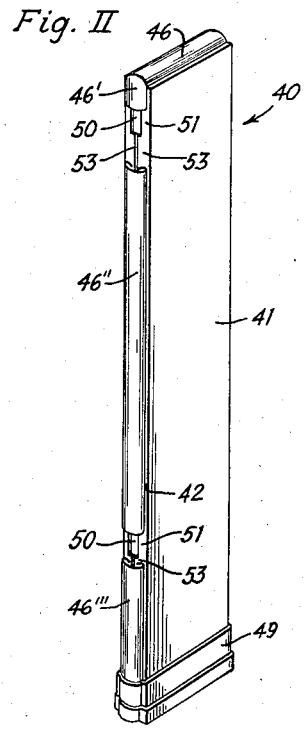
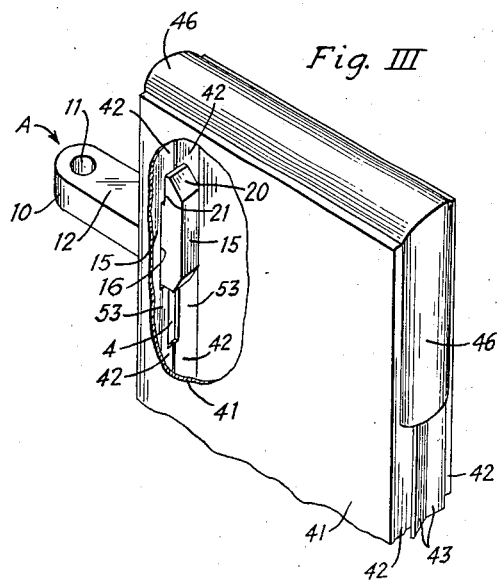
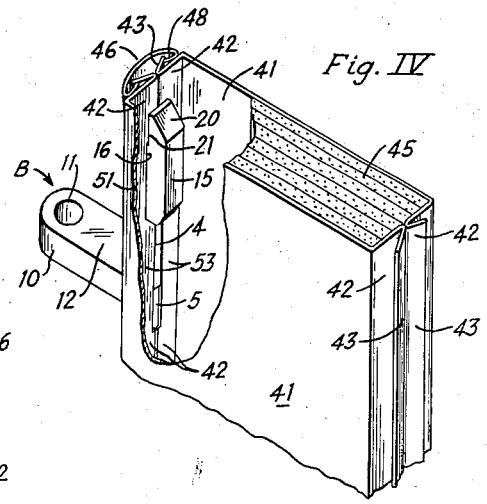
INVENTOR.
Kent W. Benham
BY
ATTORNEY March 10, 1959  K. W. BENHAM  2,876,874
PILASTER STRUCTURE AND HINGE BRACKET ASSEMBLY
Filed Nov. 15, 1957  5 Sheets-Sheet 2
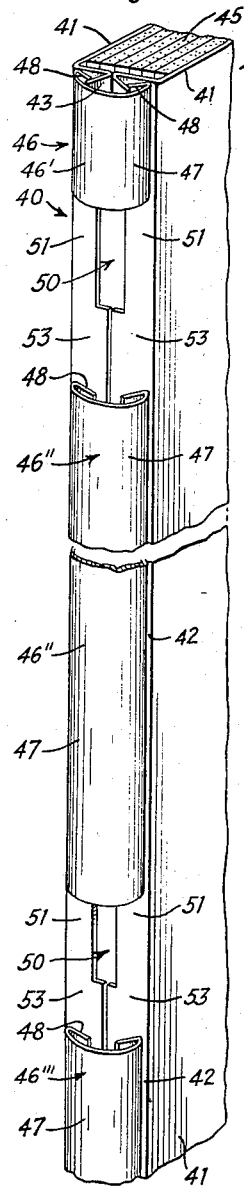
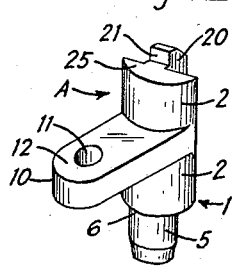
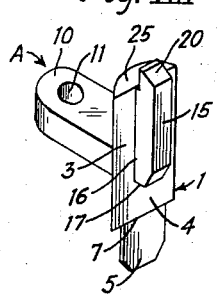
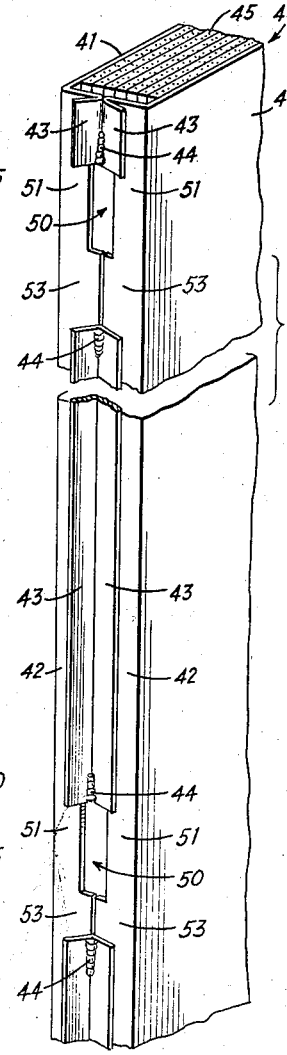
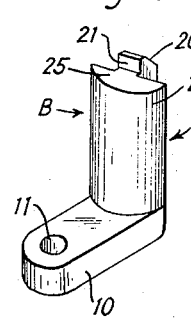
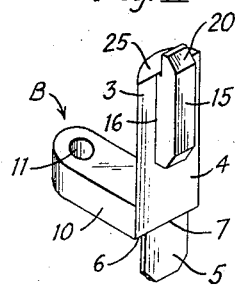
INVENTOR.
Kent W. Benham
BY
ATTORNEY

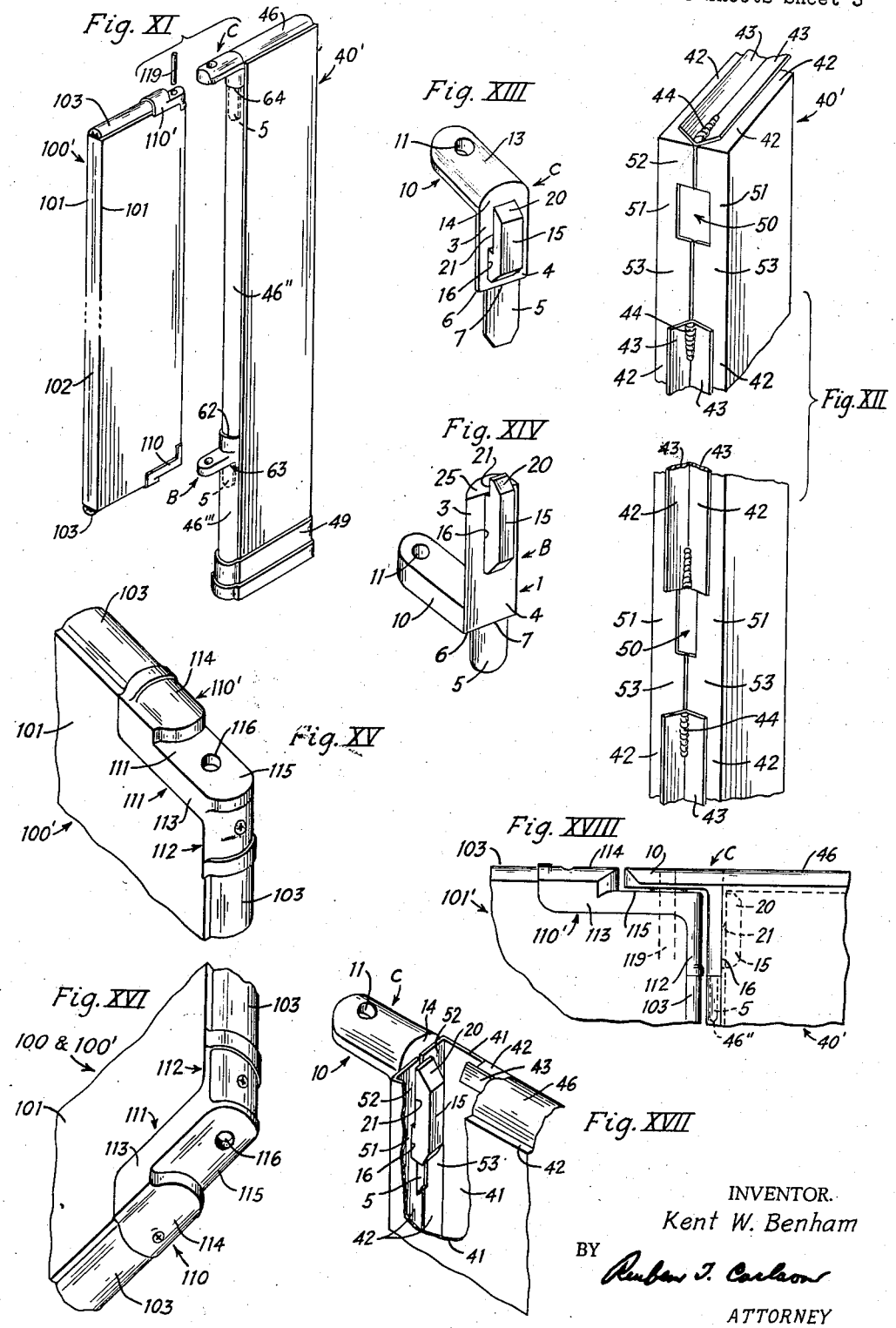

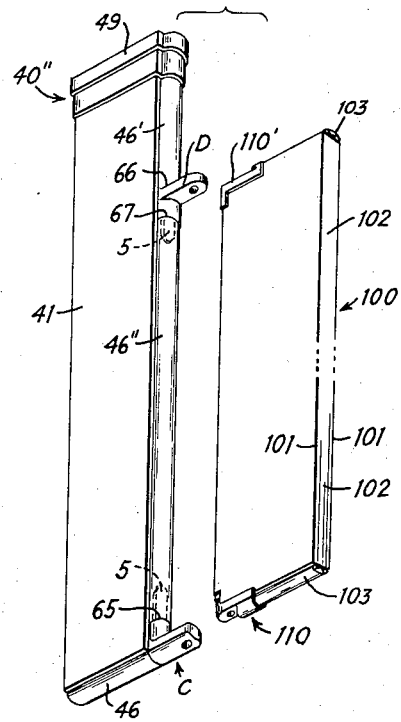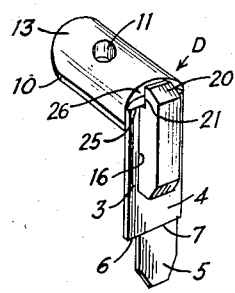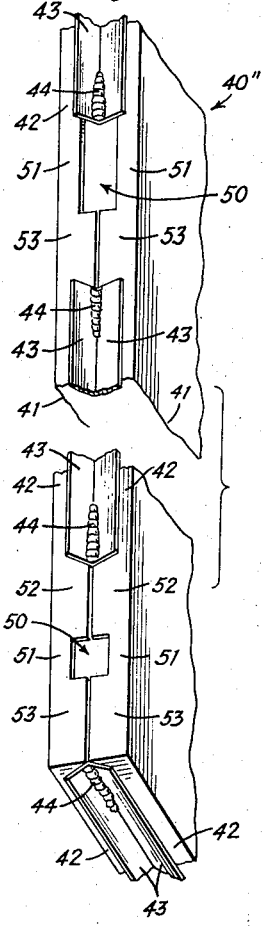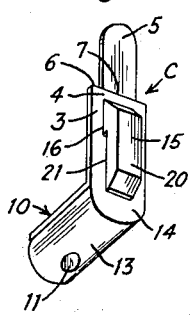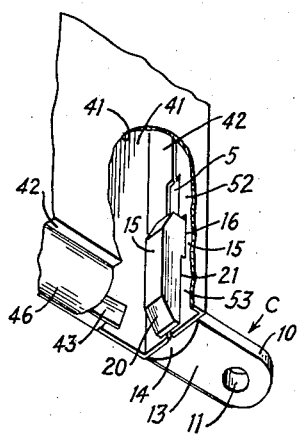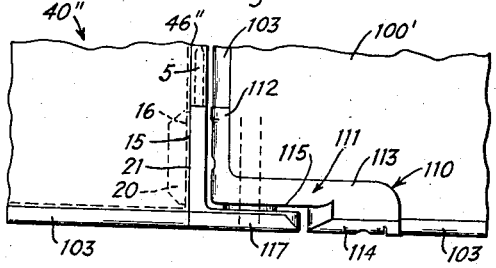

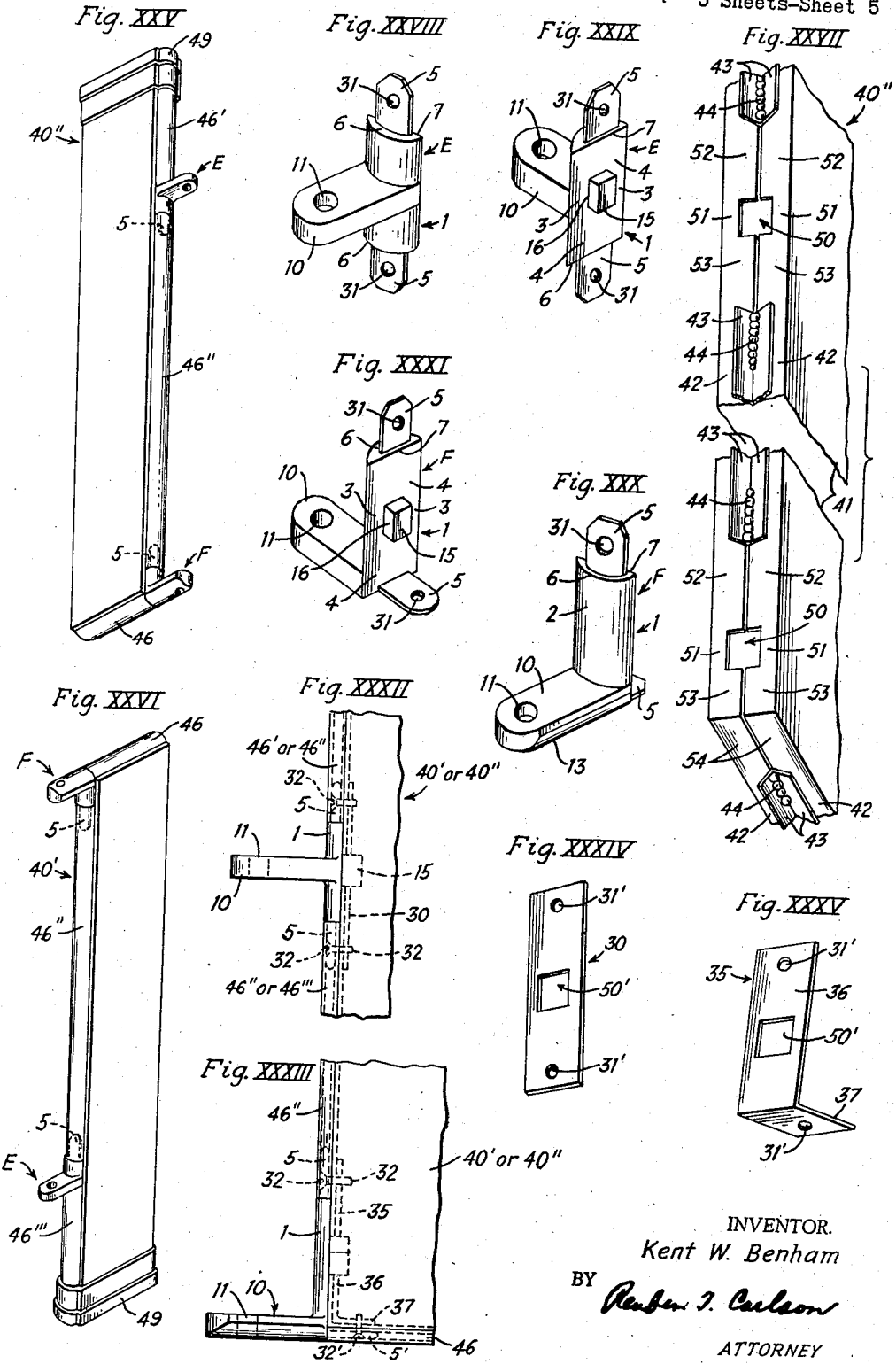

2,876,874
PILASTER STRUCTURE AND HINGE BRACKET ASSEMBLY

Kent W. Benham, Gates Mills, Ohio, assignor to The Sanymetal Products Co., Inc., Cleveland, Ohio, a corporation of Ohio Application November 15, 1957, Serial No. 696,864

23 Claims. (Cl. 20—16)

This invention relates to an improved pilaster structure and hinge bracket assembly in which the door supporting hinge bracket is rigidly secured to the jamb edge of the pilaster in cantilever suspension without the use of visible securing means.

Hinge brackets made in accordance with this invention may be cast or formed in one piece to present a body section having a door supporting arm projecting substantially at right angles from the front side thereof. The rear side of the body section has a rearwardly projecting anchor or keel block section whose base is wholly or partly surrounded by seating face portions. The anchor section is designed to project into a conforming hole or cavity formed in the jamb face of the pilaster to thereby insure accurate mounting of the bracket on the pilaster. The seating face portions of the bracket body section which surround the anchor section thereof, are designed to snugly seat against the margins of the cavity formed in the jamb face of the pilaster. The bracket is secured and locked to the pilaster by projections which extend from both ends of the body section thereof, and these projections are covered and concealed by the adjacent ends of edge finishing strips secured to the jamb face of the pilaster.

In the preferred form of this invention, the anchor section of the hinge bracket has a nose extension at one end of the body section thereof, which presents a depressed abutment face which is rearwardly offset from the rear seating face portions of the body section. A tongue section projects from the other end of the body section of the hinge bracket, and this tongue section has a cross sectional area at the base thereof which is less than the cross sectional area of the adjacent end of the body section to thereby define depressed front and rear shoulders at the base of the body section. In a less preferred form of this invention, tongue sections as above described extend from both ends of the body section of the hinge bracket which are overlapped in secured position by the adjacent ends of the jamb edging strips of the pilaster.

Hinge brackets made in accordance with this invention are particularly designed for attachment to the jamb edge of frame structures, posts and pilasters whose jamb edge is of relatively narrow width. These improved hinge brackets are particularly applicable to the jamb edge of hollow metal pilasters which measure only one to two inches or less in thickness, and which form the supporting uprights for interior cubicles as toilet and hospital cubicles and the like. Such hollow metal pilasters are formed by a pair of spaced panel facing sheets packed with sound deadening insulation and which present paired inturned flanges along the exposed vertical and horizontal edges thereof. The paired inturned flanges are provided with means for securing edge finishing strips to the exposed vertical and horizontal edges of the pilaster, and which securing means may comprise paired outturned lips formed integrally with the paired inturned flanges and joined together by exteriorly applied spot welds to provide a rigid pilaster construction. These edging strips are semi-tubular in cross section and present a contoured facing portion and paired inturned lip portions designed to interlock between the outturned lips and adjacent inturned flanges of the pilaster when the edging strip is telescoped thereover. The applied edging strips give a finished appearance to the exposed vertical and horizontal edges of the pilaster.

The improved hinge brackets of this invention are designed to be interlocked to the jamb edge of the pilaster and rigidly secured thereto in cantilever suspension. An opening is cut in the adjacent inturned flanges of the panel facing sheets which is shaped to substantially conform to the base of the anchor section of the hinge bracket which is telescoped into the opening. In the case of hinge brackets which are provided with nose extensions, the depressed abutment face of the nose extension is designed to seat against the inside face of that portion of the inturned panel sheet flanges which are located directly above or below the jamb hole or cavity, with the flange margins surrounding this hole providing a conforming seat for the rear facing portions of the hinge bracket. In the area or areas where the tongue section or sections of the hinge bracket overlap adjacent portions of the inturned panel sheet flanges, the outturned lips associated therewith may be cut away to the extent required to accommodate the overlying tongue section. In all cases, the projecting tongue sections are tapered in form to snugly telescope into the adjacent end of the semi-tubular edging strips, with adjacent ends of the edging strips snugly abutting the inset outer and inner shoulders at the base of the tongue section, the edging strips thereby serving to lock the intervening hinge bracket in fixed position.

When the hinge brackets having the nose extension are used, the abutment face of the nose extension thereof is pressed against the interior face of the adjacent flange portions of the pilaster, and the rear seating face portions of the bracket are pressed against the exterior surface of the flange portions which define the margins of the jamb cavity, upon weight application to the supporting arm of the hinge bracket.

In the hinge bracket modifications which employ no nose extension, but are provided with tongue sections which extend from both ends of the body bracket section, concealed securing means may be provided in addition to that furnished by the tongue sections which telescope into the adjacent ends of the edging strips. This additional securing means may comprise a backing plate having an anchor receiving hole therein, which is fixed to the inside face of the inturned flanges of the pilaster during assembly of the pilaster. Screws may then be applied which extend through the tongue sections and thread into the backing plate, these screws being completely concealed by the adjacent ends of the edging strips which telescope over the tongue sections.

Hinge brackets may be designed in accordance with this invention to provide both upper and lower hinge brackets for almost any type of pilaster, post or frame structure and almost any type of door to be pivotally mounted thereon. This invention embraces hinge brackets designed for application to the jamb edge of pilasters having edging strips extending both above and below the body section of the hinge bracket, with the adjacent ends of the edging strips in abutting relation to the upper and lower ends of the bracket body section. This invention additionally embraces hinge brackets which are so formed and mounted as to present their door supporting arms in substantially contoured alignment with the adjacent upper or lower horizontal edge of the pilaster. The front face of the body section of these hinge brackets is desirably contoured in symmetrical conformity with the exposed face of the abutting edging strip or strips, leaving only a fine line joint therebetween which is scarcely discernible.

When these brackets are mounted on the jamb edge in accordance with this invention, all of the securing means are completely concealed from view, and no bolts, screws or other exposed fastening means are applied, and the hinge bracket will support weights far in excess of the weight of the normal door. The defacing and unsanitary side flanges which telescope over the sides of the pilaster, together with the attaching bolts and screws whose heads are exposed, and which form necessary parts of hinge brackets as heretofore made, are completely eliminated by this invention. The exposed surfaces of these hinges can be desirably contoured in blending symmetry with the jamb edge of the pilaster to provide a structure of architectural harmony and beauty.

When these improved hinge brackets are applied to the jamb edge of the pilaster in the manner herein disclosed, precise alignment of the upper and lower hinge brackets, and accurate hanging of the door, are assured. These hinge brackets may be economically moulded or formed in one piece at substantially less cost than door supporting hinge brackets as heretofore made, and as mounted on the frame structure, present an assembly which is substantially free of projections and crevices in which dirt would collect, and thus satisfy sanitary requirements to the highest degree. These improved hinge brackets can be quickly mounted on the jamb edge of the prepared frame structure in substantially less time and at less cost than required to mount and secure hinge brackets as presently made to a supporting frame structure.

Other objects and advantages of this invention will become apparent as the disclosure proceeds.

Although the characteristic features of this invention are particularly pointed out in the claims, the invention itself, and the manner in which it is made and used, may be better understood by referring to the following description taken in connection with the accompanying drawings forming a part of this disclosure, and in which:

Fig. I is a perspective view of a floor supported pilaster having a pair of upper and lower hinge brackets made in accordance with this invention mounted on the jamb edge thereof, this view also showing in perspective a fragmentary part of a door whose hinge counterparts are designed to be swingably supported on these pilaster attached brackets;

Fig. II is a perspective view of the floor supported pilaster shown in Fig. I as the same would appear when the hinge brackets shown in Fig. I are removed from the jamb edge thereof;

Fig. III is a fragmentary perspective view of the upper part of the pilaster shown in Fig. I with the upper hinge bracket attached thereto, certain parts of the pilaster being broken away to illustrate structural details;

Fig. IV is a fragmentary perspective view of a lower part of the pilaster shown in Fig. I with the lower hinge bracket applied thereto, certain parts of the pilaster being broken away to illustrate structural details;

Fig. V is a fragmentary perspective view of the partly assembled floor supported pilaster shown in Fig. I as the same would appear prior to the application of the upper and lower hinge brackets and adjacent edging strips thereto;

Fig. VI is a fragmentary perspective view of the floor supported pilaster shown in Figs. I and V as the same would appear when the adjacent edging strips have been applied to the jamb edge thereof without the application of the upper and lower hinge brackets;

Fig. VII is a front perspective view of the upper hinge bracket designed for connection to the U-shaped hinge counterpart of the door shown in Fig. I and as it appears prior to attachment to the door supported pilaster shown in Fig. V;

Fig. VIII is a rear perspective view of the upper hinge bracket shown in Fig. VII;

Fig. IX is a front perspective view of the lower hinge bracket designed for connection to the hinge counterpart attached to the lower rear corner of the door shown in Fig. I and as it appears prior to attachment to the floor supported pilaster shown in Fig. V;

Fig. X is a rear perspective view of the lower hinge bracket shown in Fig. IX;

Fig. XI is a perspective view of a modified form of floor supported pilaster having a pair of upper and lower hinge brackets attached thereto and designed to swingably support a modified form of door, this view showing a modified form of upper hinge bracket designed for pivotal connection to a hinge counterpart fixed to the upper rear corner of the door;

Fig. XII is a fragmentary perspective view of the modified form of floor supported pilaster shown in Fig. XI as the same would appear when partly assembled and prior to the application of the upper and lower hinge brackets and adjacent edging strips thereto;

Fig. XIII is a rear perspective view of a modified form of upper hinge bracket designed for attachment to the upper end of the modified pilaster shown in Fig. XII;

Fig. XIV is a rear perspective view of the lower hinge bracket designed for attachment to the lower part of the modified pilaster shown in Fig. XII;

Fig. XV is a fragmentary perspective view of the top rear corner of the door illustrated in Fig. XI, this view showing the upper hinge counterpart in greater detail;

Fig. XVI is a fragmentary perspective view of the bottom rear corner of the door illustrated in Fig. XI and which shows the lower hinge counterpart in greater detail;

Fig. XVII is a fragmentary perspective view of the modified form of floor supported pilaster shown in Fig. XI, with the modified upper hinge bracket attached thereto, certain parts of the pilaster being broken away to reveal structural details;

Fig. XVIII is a fragmentary elevational view of the upper part of the modified form of pilaster and door shown in Fig. XI and as the same would appear when hingedly connected;

Fig. XIX is a perspective view of a ceiling supported pilaster having a pair of modified hinge brackets made in accordance with this invention mounted on the jamb edge of the pilaster as so supported, this view also showing in perspective a fragmentary part of a door whose hinge counterparts are designed to be swingably supported on these pilaster attached brackets;

Fig. XX is a fragmentary perspective view of the ceiling hung pilaster shown in Fig. XIX as the same would appear when partly assembled and prior to the application of the hinge brackets and adjacent edging strips thereto;

Fig. XXI is a rear perspective view of the upper hinge bracket designed for attachment to the ceiling hung pilaster shown in Fig. XX;

Fig. XXII is a rear perspective view of the lower hinge bracket designed for attachment to the ceiling hung pilaster shown in Fig. XX;

Fig. XXIII is a fragmentary perspective view of the lower end of the ceiling hung pilaster shown in Fig. XIX with the lower hinge bracket mounted thereon, certain parts of the pilaster being broken away to reveal structural details;

Fig. XXIV is a fragmentary elevational view of a part of the lower ends of the ceiling hung pilaster and door as hinged thereto;

Fig. XXV is a perspective view of a ceiling supported pilaster having a pair of hinge brackets of further modified form mounted on the jamb edge thereof;

Fig. XXVI is a perspective view of a floor supported pilaster having the modified hinge brackets shown in Fig. XXV attached to the jamb edge thereof;

Fig. XXVII is a fragmentary perspective view of the ceiling hung pilaster shown in Fig. XXV as the same would appear when partly assembled and prior to the application of the modified hinge brackets and adjacent edging strips thereto;

Fig. XXVIII is a front perspective view of the modified hinge bracket designed for connection to a pilaster intermediate the ends thereof;

Fig. XXIX is a rear perspective view of the modified hinge bracket shown in Fig. XXVIII;

Fig. XXX is a front perspective view of a hinge bracket of further modified form designed for connection to a pilaster adjacent the lower or upper corner thereof;

Fig. XXXI is a rear perspective view of the modified hinge bracket shown in Fig. XXX;

Fig. XXXII is a fragmentary elevational view of the modified hinge bracket shown in Fig. XXVIII as the same would appear when attached to the jamb edge of a pilaster;

Fig. XXXIII is a fragmentary elevational view of the modified hinge bracket shown in Fig. XXX as the same would appear when attached to the jamb edge of a pilaster adjacent a corner thereof;

Fig. XXXIV is a perspective view of the backing plate which is set within the jamb edge of a door to insure rigid securement of the modified hinge bracket shown in Fig. XXIX; and Fig. XXXV is a perspective view of the angular backing plate which is set within the jamb edge of a door adjacent a corner thereof to insure rigid securement of the modified hinge bracket shown in Fig. XXXI.

Similar reference characters refer to similar parts throughout the several views of the drawings and specification.

While hinge brackets made in accordance with this invention may be associated with any type of frame structure, post or pilaster, whether made of wood, metal, or other materials, these hinge brackets are particularly adapted for attachment to the jamb edge of hollow metal posts or pilasters designed to pivotally support two-way swinging doors for assembly into interior cubicles, such as hospital and toilet cubicles. These hollow metal pilasters may either be floor supported as shown in Figs. I and XI, or ceiling supported as shown in Fig. XIX.

The floor supported pilaster 40 shown in Fig. I, the modified floor supported pilasters 40' shown in Figs. XI and XXVI, and the ceiling hung pilaster 40" shown in Figs. XIX and XXV, are generally similar in construction, and are formed by a pair of panel facing sheets 41 formed from sheet metal or other strong sheet material which together present paired inturned flanges 42 along the exposed vertical and horizontal edges thereof. Each pair of inturned flanges 42 incorporate outturned lips 43 which are secured together by suitable spot welds 44 exteriorly applied to the paired outturned lips at the crotch area between them. Prior to spot welding the paired inturned lips to provide a strong construction, each pilaster is desirably filled with sound deadening and panel bracing insulation packing 45 such as slabs of fibre glass, or paperboard core material, or other relatively light packing material capable of deadening sound and bracing the panel facing sheets 41 which form the side walls of the pilaster.

The exposed vertical and horizontal edges of each pilaster are trimmed by means of edging strips 46 of semi-tubular cross section and similar in size and contour. Each edging strip 46 presents an exposed face portion 47 of generally curvilinear form, and inturned lip portions 48. The edging strips 46 are designed to be telescoped longitudinally over the outturned lips 43 so that the inturned lip portions 48 of the edging strips interlock with the outturned lips 43 and thereby firmly secured to the inturned flanges 42 of the panel facing sheets 41. The adjacent ends of the edging strips at the exposed corners of the pilaster are suitably mitre cut to provide a finished corner joint.

The supported ends of the pilasters are designed for attachment to either a horizontal floor wall or horizontal ceiling wall by means of a strong bracket fixed to the adjacent ends of the panel facing sheets 41, and the bracket is in turn secured to the horizontal wall by suitable lag screws or bolts. The wall attached ends of the pilasters and the associated wall securing means are concealed within a trimming shoe 49 which snugly telescopes over the pilaster and snugly seats against the horizontal building wall.

A pair of hinge brackets are attached to the jamb edge of each pilaster 40, 40' and 40" to support a two-way swinging door, and the hinge brackets are locked in position to the jamb edge of the pilaster by adjacent end portions of the edging strips 42 which form the finished jamb edge thereof, and without visible screws, bolts or other securing means. The floor supported pilaster 40 as shown in Fig. I has an upper hinge bracket A and a lower hinge bracket B of modified form locked to the jamb edge thereof. The modified floor supported pilaster 40' shown in Fig. XI is provided with a hinge bracket C of further modified form attached to the upper extremity of its jamb edge, and is equipped with a lower hinge bracket B attached to its jamb edge which may be similar to the lower hinge bracket B attached to the jamb edge of the pilaster 40 shown in Fig. I. The ceiling hung pilaster 40" as shown in Fig. XIX has a lower hinge bracket C attached to the extreme lower jamb edge thereof which may be similar to the upper hinge bracket C attached to the jamb edge of the pilaster 40' shown in Fig. XI, except that its vertical position is reversed. The upper jamb edge of the ceiling hung pilaster 40" shown in Fig. XIX is provided with a further modified form of hinge bracket D designed to satisfy the particular requirements of this design. The ceiling hung pilaster 40" shown in Fig. XXV has a pair of further modified hinge brackets E and F attached to the jamb edge thereof, and the floor supported pilaster 40' shown in Fig. XXVI has the same hinge brackets E and F attached to the jamb edge thereof in reversed position from that shown in Fig. XXV.

Each of the hinge brackets A, B, C and D are locked to the jamb edge of the pilaster 40, 40' and 40" by a nose section 20 at one end thereof which interlocks against the adjacent inside face portion of the adjacent inturned flanges 42 of the pilaster, and by a tongue section 5 extending from the other end thereof and over which the adjacent end of the semi-tubular edging strip 46 is telescoped. The hinge brackets E and F are locked in position by the tongue sections 5 which extend from both ends of these brackets and telescope into the adjacent edging strips 46. The hinge brackets E and F may be additionally secured if desired by backing plates 30 and 35 respectively as shown in Figs. XXXII and XXXIII.

The door openings between adjacent pilasters may be closed by two-way swinging doors which are preferably of the type known as hollow metal doors filled with sound deadening and door reinforcing packing. The door 100 as shown in Fig. I, and the similar doors 100' as shown in Figs. XI and XIX, may be formed by a pair of panel facing sheets 101 made of sheet metal, plastic or other strong sheet material having sound deadening packing 102 therebetween. The exposed vertical and horizontal edges of each door 100 and 100' may be trimmed with decorative edging strips 103 which are semi-tubular in cross section, and which are locked to paired inturned flanges of the panel facing sheets 101 as by the provision of outturned lips. The door trimming edging strips 103 may be made similar in size and in shape conformity to the edging strips 46 for the pilasters 40, 40' and 40", and similarly secured to the inturned edging flanges thereof. The face-to-face thickness of these doors is substantially the same as the face-to-face thickness of the pilasters, and usually in the order of one to one and one-half inches in thickness.

Each door is provided with a pair of hinge counterparts attached thereto and which are pivotally connected to the paired hinge brackets attached to the jamb edge of the adjacent pilaster. The upper hinge counterpart 105 associated with the door shown in Fig. I may comprise a U-shaped casting set within a U-shaped notch cut in the jamb edge of the door and fixed thereto. The upper hinge bracket A fixed to the jamb edge of the pilaster 40 shown in Fig. I is pivotally connected to the arms 106 of the hinge counterpart 105 by means of a hinge pintle 107 inserted downwardly through aligned holes 107' formed in the top horizontal edge of the door 100 and the horizontal arms 106 of the U-shaped hinge counterpart 105 as shown in Fig. I.

The lower hinge bracket B fixed to the jamb edge of the floor supported pilaster 40 as shown in Fig. I, is designed for connection to a hinge counterpart 110 which is fixed to the rear lower corner of the door 100 as shown in further detail in Fig. XVI. The modified door construction 100' shown in Fig. XI is also provided with a similar lower corner hinge counterpart 110 designed to be pivotally connected to the lower hinge bracket B fixed to the jamb edge of the modified floor supported pilaster 40' shown in Fig. XI. The door 100' shown in Fig. XIX is also equipped with a similar lower corner hinge counterpart 110 designed to be pivotally connected to the modified form of hinge bracket C attached adjacent the lower extremity of the ceiling hung pilaster 40" shown in Fig. XIX.

The upper rear corner of the modified door construction 100' shown in Fig. XI, and the upper rear corner of the similarly modified door construction 100' shown in Fig. XIX, are each equipped with an upper hinge counterpart 110' similar to the lower corner hinge counterparts 110 above referred to, but vertically reversed. The upper hinge counterpart 110' of the door 100' shown in Fig. XI is designed to be pivotally connected to the upper hinge bracket C attached to the upper extremity of the modified floor supported pilaster 40' shown in Fig. XI. The upper hinge counterpart 110' connected to the upper rear corner of the door 100' shown in Fig. XIX is designed to be pivotally connected to the further modified form of hinge bracket D which is fixed to the adjacent jamb edge of the ceiling hung pilaster 40" shown in Fig. XIX. The ceiling hung pilaster 40" shown in Fig. XXV and the modified floor supported pilaster 40' shown in Fig. XXVI are each designed to mount a door type 100'; these doors 100' being equipped with hinge counterparts 110 and 110' designed to be connected to the modified pilaster supported hinge brackets E and F.

The lower corner hinge counterpart 110 for the doors 100 and 100' is shown in further detail in Fig. XVI of the accompanying drawings, and the similar upper corner hinge counterpart 110' associated with the doors 100' is shown in greater detail in Fig. XV. Each of the lower corner hinge counterparts 110 and the upper corner hinge counterparts 110' may be formed as a one piece casting presenting a horizontal leg 111 and a vertical leg 112. The horizontal leg 111 is provided with side flanges 113 which telescope over adjacent portions of the panel facing sheets 101 of the door, and is provided with a projecting face section 114 whose exposed face is contoured in symmetry with the adjacent horizontal edging strip 103 of the door so as to provide a substantially flush surface therewith. The horizontal leg 111 of each of the hinge counterparts 110—110' is also provided with a relatively flat inset face section 115 shaped to receive the projecting door supporting arm of the adjacent hinge bracket fixed to the jamb edge of the supporting pilaster. The vertical leg 112 of each corner attached hinge counterpart 110— 110' also presents an outer face contour is symmetry with the adjacent vertical edging strip 103 of the door.

The flat inset face section 115 of the lower hinge counterpart 110 contains a thrust bearing assembly (not shown) and is provided with a hinge pintle receiving bore 116 which receives a thrust bearing supported pintle 117 on which the lower end of each of the doors 100 and 100' is swingably supported substantially without friction. The hinge pintle 117 is adjustable locked as by means of a lock nut 118 to the door supporting arm of the adjacent hinge bracket B, C, E or F fixed to the jamb edge of the supporting pilaster 40, 40' or 40". The hinge brackets C, D, E or F of the pilasters 40' or 40" are pivotally connected to the upper corner hinge counterparts 110' of the door 100' by hinging pintles 119, the hinge counterparts 110' requiring no thrust bearing.

The hinge bracket A shown in Figs. VII and VIII is designed for attachment to the floor supported pilaster 40 intermediate the ends thereof; the hinge bracket B shown in Figs. IX and X is designed for attachment to the pilasters 40 and 40' intermediate the ends thereof; the hinge bracket C shown in Figs. XIII and XXII is designed for attachment to the upper or lower extremities of the pilasters 40' and 40" as shown in Figs. XI and XIX; the hinge bracket D as shown in Fig. XXI is designed for attachment to the ceiling hung pilaster 40" intermediate the ends thereof; the hinge bracket E shown in Figs. XXIX is designed for attachment to the pilasters 40' and 40" intermediate the ends thereof as shown in Figs. XXV and XXVI; and the hinge bracket F shown in Fig. XXXI is designed for attachment to the lower or upper extremity of the pilasters 40' or 40" shown in Figs. XXV or XXVI. A series of hinge brackets are thus provided for any type of door or pilaster condition. All the hinge brackets of this invention may be formed as a one piece casting and designed for interlocking attachment to the jamb edges of the respective pilasters without the use of visible securing means.

Each of the hinge brackets A, B, C, D, E and F generally present a body section 1 whose exposed face 2 may be contoured in shaped symmetry to the adjacent exposed facing portions 47 of the adjacent edging strips 46. The body section 1 of each hinge bracket has a tapered tongue section 5 extending from one or both ends thereof. The base of the tongue section 5 has a cross-sectional area which closely conforms to the internal cross-sectional area of the edging strip 46 whose end portion is to be telescoped thereover. The base of each tongue section thus defines with the adjacent end of the body section 1 an outer shoulder 6 and an inner shoulder 7.

Each hinge bracket also presents a door supporting arm 10 extending approximately at right angles from the exposed face 2 of the body section 1 and is preferably formed integral therewith. The door supporting arm 10 has a pintle receiving hole 11 therein of suitable shape and form to receive the hinge pintle which is journaled in the hinge counterpart applied to the rear jamb edge of the door.

An anchor or keel block section 15 is formed integral with and projects from the rear face of the body section 1 of all of these hinge brackets. Each anchor section 15 has a base 16 of preferably rectangular form, and whose long and broad dimensions are less than the broad and long dimensions of the rear face of the body section 1 of the hinge bracket so that the rear face of the body section presents a pair of substantially flat side faces 3 and at least one flat end face 4 which extends between the adjacent end of the keel block section 15 and the inner shoulder 7 of the body section 1. The anchor section 15 of hinge brackets A, B, C and D presents a nose extension 20 projecting from one end thereof. The nose extension 20 presents a flat and depressed inner face 21 which is in parallel spaced relation to the plane of the flat side faces 3 of the body section 1 but rearwardly offset therefrom for a distance equal to approximately the thickness of the inturned flanges 42 of the pilaster to which the hinge bracket is to be applied.

The base 16 of the anchor section 15 of all hinge brackets is designed for insertion into a conforming hole 50 formed in the jamb edge of the pilaster. Each hole 50 is made by partly cutting away adjacent portions of the flanges 42 of the pilaster as shown in Figs. V, XII, XX and XXVII. The base 16 of the anchor section 15 is desirably substantially rectangular, and the opening 50 in the pilaster should accordingly be made substantially rectangular to conform to the size and shape of the base 16 of the anchor section 15 and yet permit convenient insertion of the anchor section therein. As thus formed, the opening 50 presents a pair of substantially flat side margins 51 and at least one substantially flat end margin 52 and/or 53 against which the flat rear faces 3 and 4 of the body section 1 of the hinge bracket are designed to snugly seat.

The upper hinge bracket A as shown in Figs. VII and VIII presents an anchor section 15 so designed that the base 16 thereof will snugly seat within the conforming opening 50 formed in the upper part of the pilaster 40 as shown in Fig. V, with the nose extension 20 of its anchor section 15 extending upwardly beyond the square cut end 25 of the body section 1 thereof. The hinge bracket A is applied to the upper end of the pilaster by inward and upward insertion of the anchor section 15 and nose extension thereof into the opening 50, and so that the flat and depressed inner face 21 will seat against the inside face of the adjacent uncut and inturned flanges 42 of the pilaster 40 which are positioned above the body section 1 of the hinge bracket A. As thus seated, the end face 25 of the body section 1 will substantially abut the upper edge of the opening, and lower end 17 of the anchor section 15 will substantially abut the lower edge of the opening 50, and the sides of the base 16 of the block anchor 15 will substantially abut the side edges of the opening.

The flat rear side faces 3 of the body section 1 of the hinge bracket A will then also seat flatly against the side flange margins 51 of the pilaster, and the end face 4 of the hinge bracket will seat against the outer face of the lower flange margins 53 which are adjacent the lower edge of the opening 50. It will be noted that the lower flange margins 53 directly below the upper opening 50 present flat outer faces formed by cutting away the adjacent portions of the outturned lips 43. The adjacent terminal ends of the outturned lips 43 are sufficiently spaced from the lower edge of the opening 50 as shown in Fig. V to also permit the downwardly extending tongue sections 5 of the hinge bracket A to also overlie the lower flange margins 53 of the pilaster 40.

As thus mounted, the hinge bracket A is fixed to the jamb edge of the pilaster 40 in cantilever suspension, and when weight is applied to the door supporting arm 10 thereof, the depressed inner face 21 of the nose extension 20 of the hinge bracket A will brace against the inside face of the adjacent upper flange portions 42 of the pilaster 40, and the flat side faces 3 and end face 4 of the hinge bracket A will brace against the side flange margins 51 and lower flange margin 53 adjacent the keel receiving opening 50 at the upper end of the pilaster 40.

The jamb edge of the pilaster 40 is covered by three semi-tubular edging strip sections comprising an upper edging strip 46′, an intermediate edging strip 46″, and a lower edging strip 46‴. The upper edging strip 46′ is downwardly telescoped over the adjacent outturned lips 43 and presents a square cut end designed to abut against the square cut end 25 of the body section 1 of the hinge bracket A to provide a fine seam line joint 60 therebetween as shown in Fig. I. The intermediate edging strip 46″ is upwardly telescoped over the adjacent outturned lips 43 of the pilaster so that the tapered tongue section 5 is snugly telescoped into the adjacent end of the semi-tubular intermediate edging strip 46″, thereby further locking the hinge bracket A in rigid position to the jamb edge of the door. The intermediate edging strip 46″ also has a square cut upper end designed to abut against the adjacent outer and inner shoulders 6 and 7 of the body section 1 of the hinge bracket A to form a flush hair line joint 61 with the lower end of the body section 1 of the hinge bracket A.

The door supporting arm 10 of the hinge bracket A may project from the approximate mid-section of the contoured outer face 2 of the body section of this bracket, and may present relatively flat upper and lower faces 12. The arm section 10 is of sufficient length to extend between the horizontal arms 106 of the U-shaped hinge counterpart 105 inset within the rear jamb edge of the door 100 as shown in Fig. I and pivotally connected thereto as by the hinge pintle 107.

The lower hinge bracket B as shown in Figs. IX and X and designed for attachment to the lower part of the floor supported pilaster shown in Fig. V, and the lower hinge bracket B shown in Fig. XIV and designed for attachment to the lower part of the modified floor supported pilaster 40′ shown in Fig. XII, are substantially identical in shape and form. The hinge brackets B are also somewhat similar to the hinge bracket A as above described, except that the door supporting arm 10 of hinge bracket B is attached adjacent the lower end of the body section thereof as indicated in Figs. IX and X. The door supporting arm 10 of hinge bracket B presents a substantially flat upper face 12, but its lower face may be arcuately shaped and contoured in substantial conformity with the lower horizontal edging strip 103 of the door 100 or 100′ with which it is associated. The lower rear corner of the door 100 or modified door 100′ as shown in Figs. I and XI is provided with a lower corner hinge counterpart 110 as previously described, and which presents a flat inset face section 115 adjacent which the flat upper face 12 of the arm section 10 of the hinge bracket B is positioned. The pintle receiving hole 11 in the arm section 10 of hinge bracket B is preferably tapered to receive the tapered end of the thrust bearing supported pintle 117.

The rectangular hole 50 formed by cutting away portions of the inturned flanges 42 at the lower part of the pilaster 40 or 40′ is shaped to receive the keel section 15 of the hinge bracket B, with the hinge bracket B supported from the pilaster 40 or 40′ in cantilever suspension. The flat rear side faces 3 of the body section 1 of the hinge bracket B seat flatly against the adjacent side flange margins 51 of the pilaster, and the end face 4 thereof seats flatly against the outer face of the lower flange margins 53 which are adjacent the lower edge of the opening 50. The adjacent terminal ends of the outturned lips 43 which are below the opening 50 are also cut away as shown in Figs. V and XII to provide room for the tapered tongue section 5 extending downwardly from the body section 1 of the hinge bracket B.

When the anchor section 15 of hinge bracket B has been inserted into the opening 50, the depressed inner face 21 of the nose extension 20 thereof will brace against the inside face of the adjacent upper flanges 42 of the pilaster 40 or 40′, and the flat side faces 3 and the end face 4 of the hinge bracket B will brace against the outside faces of the side flange margins 51 and lower flange margins 53 adjacent the anchor receiving opening 50 at the lower end of the pilaster 40 or 40′.

The lower square cut end of the intermediate edging strip 46″ is designed to abut against the upper square cut end 25 of the hinge bracket B to provide a fine seam line joint 62 therebetween as shown in Figs. I and XI. The lower edging strip 46‴ also has a square cut end designed to abut against the outer and inner shoulders 6 and 7 of the hinge bracket B to provide a fine line joint 63 therebetween as shown in Figs. I and XI. The hinge bracket B is thus rigidly mounted in cantilever suspension so that when door weight is applied to the projecting arm section 10 thereof, the nose extension 20 of the hinge bracket B will brace against the inside face of the adjacent upper flanges 42, and the flat side faces 3 and end face 4 of the hinge bracket B will brace against the outside faces of the side flange margins 51 and the lower flange margins 53 of the pilaster 40 or 40'. The hinge bracket B is further rigidly locked in position by the tapered tongue section 5 thereof which extends into the end of the semi-tubular edging strip 46''' positioned directly below the hinge bracket B.

The upper hinge bracket C as shown in Fig. XIII and designed for attachment to the upper part of the modified floor supported pilaster 40' as shown in Fig. XI, is substantially identical in form and construction to the lower hinge bracket C shown in Fig. XXII and designed for attachment to the lower part of the ceiling hung pilaster 40'' shown in Fig. XX. The hinge bracket C is designed for attachment to the hinge counterpart 110' at the upper rear corner of the modified door 100' shown in Fig. XI, and the similar hinge bracket C is designed for attachment in inverted position to corner hinge counterpart 110 attached to the lower corner of the modified door 100' shown in Fig. XIX.

The hinge bracket C presents a door supporting arm 10 which extends from one extremity of the body section 1 thereof. Each arm section 10 of the hinge bracket C presents a relatively flat inner face 12 and a curvilinear outer face 13 which may be contoured in substantial conformity with the adjacent horizontal edging strip 46 of the pilaster 40' or 40''. As shown in Figs. XIII and XXII, the arm section 10 of hinge bracket C presents a flat vertical face 14 which is substantially flush with the flat side faces 3 and end face 4 of the body section 1 thereof. The anchor section 15 of the hinge bracket C also presents a base 16 of reduced length, and an elongated nose extension 20 positioned within the area of the flat end face 14 thereof. The depressed inner face 21 of the elongated nose extension 20 and the rear end face 14 of these hinge brackets define a vertical slot therebetween. The hinge bracket C presents a tongue section 5 extending from the other end thereof whose base defines the abutment shoulders 6 and 7.

The hinge bracket C is applied to the upper end of the modified pilaster 40' by inserting the anchor section 15 and elongated nose extension 20 thereof through the upper rectangular opening 50, this opening being reduced in area in conformity with the reduced area of the base 16 of its anchor section. The flange margins 52 extending from the opening 50 to the upper rear corner of the pilaster 40' telescope into the slot defined between the faces 14 and 21 of the mounted hinge bracket C. The depressed inner face 21 of the elongated nose section 20 braces against the inside face of the flange margins 52, and the upper end face 14 of the bracket C braces against the outside face of the flange margins 52. The lower flange margins 53 below the opening 50 provide bracing support for the lower end face 4 of the bracket C, with the tongue section 5 of this bracket extending thereover. The downwardly extending tongue section 5 of bracket C telescopes into the adjacent upper end of the intermediate edging strip 46'' to further lock the hinge bracket C in fixed position. The square cut upper end of the intermediate edging strip 46'' forms a smooth line joint 64 with the adjacent end of the body section 1 of this bracket as shown in Fig. XI. The arm section 10 of this bracket is designed to be pivotally connected to the hinge counterpart 110' secured to the upper rear corner of the door 101 by a hinge pintle 119 as shown in Fig. XVIII.

The lower hinge bracket C attached to the lower jamb edge corner of the ceiling suspended pilaster 40'' as shown in Fig. XX may be similar in all respects to the hinge bracket C attached to the upper corner of the floor supported pilaster 40', except that its position is reversed. The slot defined between the inner face 21 of the elongated nose section 20 and the rear end face 14 telescopes over the flange margins 53 extending from the anchor receiving hole 50 thereof to the lower end of the pilaster 40'', the opening 50 being sized to snugly receive the reduced base 16 of the anchor section 15. As mounted, the hinge bracket C presents its rear end face 14 in bearing relation to the outside faces of the flange margins 53, and presents the depressed inner face 21 of its elongated nose extension 20 in bearing relation to the inside faces of the flange margins 53. The upper flange margins 52 extending above the opening 50 present their outer faces in bearing relation to the rear end face 4 of the hinge bracket C, the upper flange margins 52 being of sufficient length to accommodate the tongue section 5 which projects upwardly from the body section 1. The hinge bracket C as thus mounted is rigidly locked in position partly by its upwardly extending tongue section 5 which snugly telescopes into the semi-tubular end portion of the intermediate edging strip 46'', and partly by the lower flange margins 53 which are gripped between the inset face and flat end face of the bracket C as shown in Fig. XXIII. The square cut lower end of the intermediate edging strip 46'' forms a fine line joint 65 with the adjacent body section 1 of the inverted hinge bracket C as shown in Fig. XIX. The pintle receiving hole 11 in the projecting arm section 10 of the hinge bracket C is preferably tapered to receive the tapered end of the thrust bearing supporting pintle 117 which extends into the adjacent lower corner bracket 110' of the door.

The upper hinge bracket D as shown in Fig. XXI is designed for attachment to the upper part of the ceiling hung pilaster 40'' shown in Fig. XIX. The upper hinge bracket D has its door supporting arm 10 attached adjacent the upper end of its body section 1. This door supporting arm 10 presents a substantially flat lower inner face 12, but its outer face 13 is preferably arcuately shaped and contoured in substantial conformity with the upper horizontal edging strip 103 of the door 100' with which it is associated. The upper corner hinge counterpart 110' of the door 100' as shown in Fig. XIX presents its flat inset face section 115 adjacent the flat face 12 of the arm section 10 of the hinge bracket D. The pintle receiving hole 11 in the arm section 10 of hinge bracket D is shaped to receive a hinge pintle 119 which extends through the upper corner bracket counterpart 110' of the door 100'.

The rectangular hole 50 formed by cutting away portions of the inturned flanges 42 at the upper part of the ceiling hung pilaster 40'' is shaped to receive the anchor section 15 of the hinge bracket D, with the depressed face 21 of the nose section 20 thereof seating against the inside face of the pilaster flanges 42 so that the bracket D is thereby supported in cantilever suspension. The flat rear side faces 3 of the body section 1 of the hinge bracket D seat flatly against the adjacent side flange margins 51 of the pilaster, with the end facing 4 seating flatly against the outer face of the lower flange margins 53 which are adjacent the lower edge of the opening 50. The adjacent terminal ends of the outturned lips 43 which are below the opening 50 are also cut away as shown in Fig. XX to provide room for the tapered tongue section 5 extending downwardly from the body section 1 of the hinge bracket D.

The keel section 15 of the hinge bracket D is inserted into the opening 50 so that the depressed inner face 21 of the nose extension 20 braces against the inside face of the adjacent upper flanges 42, with the flat side faces 3 and the end face 4 bracing against the side flange margins 51 and lower flange margins 53 of the pilaster 40''. The upper edging strip 46' has a square cut end which abuts against the square cut end 25 of the body section 1 of the bracket D, while the inner end 26 of its arm section 10 is arcuately contoured in conformity with the arcuate contour of the upper edging strip 46'. Thus the square cut end of the upper edging strip 46' forms fine butt joints with the square cut end 25 and arcuate face 26 of the hinge bracket D. The square cut end of the intermediate edging strip 46'', as telescoped over the downwardly projecting tongue section 5, forms a fine butt joint 67 with the outer shoulder 6 of the hinge bracket D.

The hinge bracket E, as shown in Figs. XXVIII and XXIX, is designed for attachment to either a ceiling hung pilaster 40″ or a floor supported pilaster 40′ intermediate the ends thereof as shown in Figs. XXV and XXVI. The hinge bracket E has a vertically extending tongue extension 5 projecting from both ends of the body section 1 thereof, the base of each tongue section 5 defining with the body section 1 an inset outer shoulder 6 and an inset rear shoulder 7. The door supporting arm 10 of this bracket may extend laterally from approximately the midsection of the contoured outer face 2 of the body section 1 thereof, and has a pintle receiving hole therein designed to receive the pintle associated with either the lower corner hinge counterpart 110 or upper corner hinge counterpart 110′ of the door 100′. The bracket E presents an anchor section 15 of reduced size designed to extend into the conforming opening 50 formed in the jamb edge of the pilaster as shown in Fig. XXVII. The bracket E is also provided with end faces 4 extending both above and below the anchor section 15 which are designed to seat flatly against the flange margins 52 and 53 of the pilaster, with the side faces 3 of the bracket seating against the side margin 51 of the pilaster. The square cut ends of the adjacent semi-tubular edging strips 46′ and/or 46‴ and 46″ are designed to snugly abut against the outer and inner shoulders 6 and 7 of the bracket body section to provide a seam line joint therebetween. The tongue sections 5 which snugly project into the semi-tubular edging strips as telescoped thereover, retain the bracket E in rigidly mounted position.

If it is found desirable to further secure the hinge bracket E in mounted position, a flat backing plate 30, as shown in Fig. XXXIV, may be positioned adjacent the inside faces of the flange margins 51, 52 and 53 of the pilaster during assembly thereof, and the plate 30 may be secured thereto by weldments. The backing plate 30 has a hole 50′ which is in aligned conformity with the anchor receiving hole 50 in the pilaster and through which the anchor section 15 also projects. Each tongue section 5 may have a screw receiving hole 31 therein which aligns with a threaded hole 31′ in the backing plate 30, and through which a securing screw 32 may be inserted. It will be noted that the shank of the securing screw 32 does not interfere with the telescoping application of the adjacent end of the edging strip 46, since the shank of the screw 32 is straddled by the adjacent inner edges of the inturned lip portions 48 of the edging strip.

The hinge bracket F as shown in Figs. XXX and XXXI is designed for attachment to either the upper or lower corner of the floor supported pilaster 40′ or ceiling hung pilaster 40″. The hinge bracket F presents its arm section 10 adjacent one end of the body section 1 thereof, and one of its tongues 5 projects rearwardly from the adjacent end face 4 thereof so as to overlie the adjacent flat edge margins 54 forming a part of the horizontal edge of the pilaster as shown in Fig. XXVII. The anchor section 15 of the hinge bracket F is inserted into the conforming hole 50 of the pilaster so that the side faces 3 and end faces 4 snugly seat against the outside face of the side flange margins 51 and upper and lower end margins 52 and 53 of the pilaster, and with the laterally extending tongue section 5 thereof overlying the adjacent end margin 54 forming a part of the horizontal edge of the pilaster. The lower end of the intermediate edging strip 46″ telescopes over the vertically projecting tongue 5 and forms a fine seam line joint with the outer and inner shoulders 6 and 7 thereof, while the adjacent end of the horizontal edging strip 46 telescopes over the laterally projecting tongue section 5 of the bracket F to form a seam line joint with the rear face of bracket F, whose arm section 10 presents an outer face 13 which may be contoured in conformity with the outer face of the horizontal edging strip 46. The vertically projecting tongue 5 and laterally projecting tongue 5 of the bracket F are thus locked to the pilaster by the adjacent ends of the edging strips 46″ and 46 which telescope thereover and thus secure the hinge bracket F in rigidly fixed position.

If further securement of the hinge bracket F is desired, an angular shaped backing plate 35 as shown in Fig. XXXV may be set within the pilaster during formation thereof, so that the vertical leg 36 of the backing plate 35 snugly seats against the inside faces of the flange margins 51, 52 and 53 of the pilaster, and so that the horizontal leg 37 of the backing plate seats against the inside face of the flange margins 54 extending along the horizontal edge of the pilaster, as shown in Fig. XXXIII. Securing screws 32 may be inserted through screw receiving holes 31 in the tongue sections 5, and which align with the threaded screw holes 31′ in the vertical and horizontal legs of the angle bracket 35. The vertical leg 36 of the angle bracket 35 has a conforming hole 50′ which aligns with the anchor receiving hole 50 in the pilaster to receive the anchor section 15 of the hinge bracket F.

While several forms and preferred embodiments of the hinge bracket and pilaster structure assembly of this invention have been above described, it will be appreciated that various modified forms of hinge brackets and post and pilaster assemblies may be made by following the teachings of this invention. For example, tongue sections 5 may be provided at both ends of the body section 1 of the hinge bracket, as typified by hinge brackets E and F, and wherein the tongue sections 5 are designed to telescope into the adjacent ends of semi-tubular edging strips positioned both above and below the body section 1 of the hinge bracket. Where the hinge bracket is to be positioned directly adjacent either the upper corner of a floor supported pilaster, or directly adjacent the lower corner of a ceiling hung pilaster, the hinge bracket may be provided with a rearwardly projecting tongue section 5 which extends substantially at right angles to the rear face of the body section thereof as shown in Fig. XXXIII, and which is designed to telescope into the adjacent end of the horizontal edging strip 46 which is slidably secured to the adjacent horizontal edge of the pilaster.

This invention also contemplates the provision of one or more anchor or lug sections extending from the rear face of the body section and which project into one or more conforming slots or openings formed in the adjacent flanges 42 of the pilaster and which insure precise door supporting alignment of the hinge brackets. Since the tongue section or sections which project from one or both ends of the bracket body section are fully concealed by the pilaster edging strip or strips which telescope thereover, these tongue sections may be secured to the adjacent inturned flanges of the pilaster as by concealed screws or other concealed fastening means, in which case the nose extension associated with the anchor lug or section may be eliminated.

In its broader aspects, this invention embraces a combination of novel features wherein the hinge brackets may be securely mounted on the jamb edge of relatively narrow posts and pilasters, and securely held in position by concealed securing means or devices which are wholly invisible when the hinge and pilaster structure is fully assembled, and which presents an assembly wherein the exterior face of the bracket body section may be made in contoured symmetry with the exposed faces of the pilaster trimming edging strips, and as assembled, present fine line butt joints therebetween which are scarcely discernible, and wherein the hinge bracket is securely locked and held in fixed position by the adjacent end of the edging strip or strips which snugly telescope over the tongue section or sections of the hinge brackets.

Pilaster structures and hinge bracket assemblies made in accordance with this invention feature the elimination of exposed screws, bolts and other visibly exposed securing devices which blemish the appearance of the assembly, and which features the elimination of bracket side flanges and other projections heretofore used to secure the hinge bracket to the pilaster, and which provide areas for the collection of dirt and foreign matter which cannot readily be removed. The hinge brackets of this invention can be cast or formed in one piece at substantially less cost than door supporting hinge brackets heretofore made and used, and can be mounted on the jamb edge of the pilaster at the factory in precise door supporting alignment and with less labor and at less cost than the pilaster and hinge bracket assemblies heretofore made and used. The necessary modifications to the jamb edge of the pilaster can be accomplished in accordance with this invention without additional material and at no extra cost when cutting and fabricating the panel facing sheets from which the pilaster is formed.

While certain novel features of this invention have been above disclosed and are pointed out in the claims, it will be understood that various omissions, substitutions and changes may be made by those skilled in the art, without departing from the spirit of this invention.

What is claimed is:

1. A one-piece hinge bracket which includes, a body section, a door supporting arm projecting from one side of said body section, an anchor section projecting from the opposite side of said body section, said body section presenting a seating surface adjacent the base of said anchor section, a nose extension projecting from one end of said anchor section and presenting a depressed abutment face adjacent to one end of said body section, and a tongue section projecting from the opposite end of the body section.

2. A one-piece hinge bracket which includes, a body section, a door supporting arm projecting from one side of said body section, an anchor section projecting from the opposite side of said body section, said body section presenting a seating surface adjacent the base of said anchor section, a nose extension projecting from one end of said anchor section and presenting a depressed abutment face positioned adjacent one end of said body section, and a tongue section projecting from the opposite end of said body section, said body section presenting inset shoulders on both sides thereof adjacent the base end of said tongue section.

3. An integrally formed hinge bracket which includes, a body section, a door supporting arm projecting from one side of said body section, an anchor section projecting from the opposite side of said body section, said body section having a relatively flat seating surface adjacent the base of said anchor section, a nose extension projecting from one end of said anchor section and presenting a depressed abutment face positioned adjacent one end of said body section, and a tongue section projecting from the opposite end of said body section, the base end of said tongue section having a cross sectional area less than the cross sectional area of the adjacent end of said body section whereby said body section presents inset shoulders on both sides thereof adjacent the base end of said tongue section.

4. An integrally formed hinge bracket which includes, a body section presenting an arcuately contoured front face and relatively flat rear face portions, a door supporting arm projecting from the contoured front face of said body section, an anchor section projecting rearwardly from said body section between the rear face portions thereof, a nose extension projecting from one end of said anchor section and positioned adjacent one end of said body section, said nose extension presenting a depressed abutment face rearwardly from the rear face portions of said body section, and a tongue section projecting from the opposite end of said body section.

5. An integrally formed hinge bracket which includes, a body section presenting an arcuately contoured front face and relatively flat rear face portions, a door supporting arm projecting from the contoured front face of said body section, an anchor section projecting from said body section and having a substantially rectangular shaped base positioned within the inner boundaries of the rear face portions of said body section, a nose extension projecting from one end of said anchor section and positioned adjacent one end of said body section, said nose extension presenting a depressed abutment face rearwardly offset from the rear face portions of said body section, and a tongue section projecting from the opposite end of said body section.

6. An integrally formed hinge bracket which includes, a body section presenting an arcuately contoured front face and relatively flat rear face portions, a door supporting arm projecting from the approximate midsection of the contoured front face of said body section, an anchor section projecting rearwardly from said body section between the rear face portions thereof, a nose extension projecting from one end of said anchor section and positioned adjacent one end of said body section, said nose extension presenting a depressed abutment face rearwardly offset from the rear face portions of said body section, and a tongue section projecting from the opposite end of said body section.

7. An integrally formed hinge bracket which includes, a body section presenting an arcuately contoured front face and relatively flat rear face portions, a door supporting arm projecting from the contoured front face of said body section adjacent one end thereof, said supporting arm presenting an outer face arcuately contoured in substantial conformity with the contoured front face of said body section, an anchor section projecting rearwardly from said body section between the rear face portions thereof, a nose extension projecting from one end of said anchor section and positioned adjacent one end of said body section, said nose extension presenting a depressed abutment face rearwardly offset from the rear face portions of said body section, and a tongue section projecting from the opposite end of said body section.

8. A one-piece hinge bracket which includes, a body section, a door supporting arm projecting laterally from one side of said body section adjacent one end thereof, a tongue section projecting from the other end of said body section, an anchor section projecting from the opposite side of said body section, said body section and supporting arm together presenting substantially flat and coplanar face portions extending around the base of said anchor section, and a nose extension projecting from one end of said anchor section, said nose extension presenting a depressed abutment face rearwardly offset from said rear face portions, said abutment face and adjacent rear face portions together defining a slot therebetween.

9. A one-piece hinge bracket which includes, a body section presenting a substantially flat end, a door supporting arm projecting from one side of said body section adjacent the flat end thereof, a tongue section projecting from the other end of said body section, an anchor section projecting from the opposite side of said body section, said body section presenting substantially flat face portions adjacent the base of said anchor section, and a nose extension projecting from one end of said anchor section and presenting a depressed abutment face rearwardly offset from the plane of said rear face portions.

10. A door supporting assembly including in combination, a hinge bracket and a frame structure supporting the hinge bracket in cantilever suspension, said hinge bracket having a body section, a door supporting arm projecting from one side of said body section, an anchor section projecting from the opposite side of said body section, said body section presenting a seating face adjacent the base of said anchor section, a nose extension projecting from one end of said anchor section and adjacent one end of said body section, said nose extension presenting a depressed abutment face rearwardly offset from the seating face of said body section, and a tongue section projecting from the other end of said body section, said frame structure presenting a jamb wall having an opening formed therein into which the anchor section of said hinge bracket projects, said jamb wall presenting an interior face portion adjacent said opening and in abutting relation to the abutment face of said nose extension and exterior face portions adjacent said opening providing a seat for the seating face of the bracket body section, and a semi-tubular edging strip slidably secured to the exterior face of the jamb wall and having an end portion thereof telescoped over the tongue section of said hinge bracket.

11. A door supporting assembly including in combination, a hinge bracket and a frame structure supporting the hinge bracket in cantilever suspension, said hinge bracket having a body section, a door supporting arm projecting from the front side of said body section, an anchor section projecting from the rear side of said body section, said body section presenting a seating face adjacent the base of said anchor section, a nose extension projecting from one end of said anchor section and positioned adjacent one end of said body section, said nose extension presenting a depressed abutment face rearwardly offset from the seating faces of said body section, and a tongue section projecting from the other end of said body section, said frame structure presenting a jamb wall having an opening formed therein into which the anchor section of said hinge bracket projects, said jamb wall presenting an interior face portion adjacent said opening and in abutting relation to the abutment face of said nose extension and exterior face portions adjacent said opening providing a seat for the seating face of the bracket body section, and a semi-tubular edging strip slidably secured to the exterior face of the jamb wall and having an end portion thereof telescoped over the tongue section of said hinge bracket, the front side of the body section of the hinge bracket being substantially flush with the exterior face of said edging strip.

12. A door supporting assembly including in combination, a hinge bracket and a frame structure supporting the hinge bracket in cantilever suspension, said hinge bracket having a body section, a door supporting arm projecting from the front face of said body section, an anchor section projecting from the rear face of said body section, said body section presenting a seating face adjacent the base of said anchor section, a nose extension projecting from one end of said anchor section and adjacent one end of said body section, said nose extension presenting a depressed abutment face rearwardly offset from the adjacent seating faces of said body section, and a tongue section projecting from the opposite end of said body section, said body section presenting an inset shoulder adjacent the base of said tongue section, said frame structure presenting a jamb wall having an opening formed therein into which the anchor section of said hinge bracket projects, said jamb wall presenting an interior face portion adjacent said opening and in abutting relation to the abutment face of said nose extension and exterior face portions adjacent said opening providing a seat for the seating faces of the bracket body section, and a semi-tubular edging strip slidably secured to the exterior face of the jamb wall and having one end thereof substantially in abutting relation to the adjacent shoulder of the body section with the adjacent end portion thereof telescoped over the tongue section of said hinge bracket.

13. A door supporting assembly including in combination, a hinge bracket and a frame structure supporting the hinge bracket in cantilever suspension, said hinge bracket having a body section presenting a substantially flat end face, a door supporting arm projecting from the front face of said body section, an anchor section projecting from the rear face of said body section, said body section presenting a seating face adjacent the base of said anchor section, a nose extension projecting from one end of said anchor section and adjacent the flat end face of said body section, said nose extension presenting a depressed abutment face rearwardly offset from the adjacent seating face of the body section, and a tongue section projecting from the opposite end of said body section, said body section presenting an inset shoulder adjacent the base of said tongue section, said frame structure presenting a jamb wall having an opening formed therein into which the anchor section of said hinge bracket projects, said jamb wall presenting an interior face portion adjacent said opening and in abutting relation to the abutment face of said nose extension and exterior face portions adjacent said opening providing a seat for the seating face of the bracket body section, a first semi-tubular edging strip slidably secured to the exterior face of the jamb wall and having one end thereof substantially in abutting relation to the adjacent shoulder of the body section and the adjacent end portion thereof telescoped over the tongue section of said hinge bracket, and a second semi-tubular edging strip slidably secured to the exterior face of the jamb wall and having one end thereof substantially in abutting relation to the flat end face of the bracket body section.

14. A door supporting assembly including in combination, a hinge bracket and a frame structure supporting the hinge bracket in cantilever suspension, said hinge bracket having a body section presenting a substantially flat end face, a door supporting arm projecting from the front face of said body section, an anchor section projecting from the rear face of said body section, said body section presenting a seating face adjacent the base of said anchor section, a nose extension projecting from one end of said anchor section and extending beyond the adjacent flat end face of the body section, said nose extension presenting a depressed abutment face rearwardly offset from the plane of the seating face of said body section, and a tongue section projecting from the opposite end of said body section, said body section presenting an inset front shoulder adjacent the base of said tongue section, said frame structure presenting a jamb wall having an opening formed therein into which the anchor section of said hinge bracket projects, said jamb wall presenting an interior face portion adjacent said opening and in abutting relation to the abutment face of said nose extension and exterior face portions adjacent said opening providing a seat for the seating face of the bracket body section, a first semi-tubular edging strip slidably secured to the exterior face of the jamb wall and having one end thereof substantially in abutting relation to the adjacent inset shoulder of the bracket body section and the adjacent end portion thereof telescoped over the tongue section of said hinge bracket, and a second semi-tubular edging strip slidably secured to the exterior face of the jamb wall and having one end thereof substantially in abutting relation to the flat end face of the bracket body section, the front face of said bracket body section being contoured in substantial conformity with the exterior face contours of said edging strips.

15. A door supporting assembly including in combination, a hinge bracket and a frame structure supporting the hinge bracket in cantilever suspension, said hinge bracket having a body section, a door supporting arm projecting from the front face of said body section at one end thereof, an anchor section projecting from the rear face of said body section, the rear face of said body section and the rear end face of said supporting arm together presenting a substantially coplanar seating surface in surrounding relation to the base of said anchor section, a nose extension projecting from one end of said anchor section, said nose extension presenting a depressed abutment face rearwardly offset from the adjacent seating surface of the hinge bracket and which together define a locking slot therebetween, and a tongue section projecting from the opposite end of said body section, said body section presenting an inset front shoulder adjacent the base of said tongue section, said frame structure presenting a jamb wall having an opening formed therein into which the anchor section of said hinge bracket projects, said jamb wall presenting a wall portion adjacent said opening which telescopes into said locking slot and exterior face portions adjacent said opening providing a seat for the seating surface of the hinge bracket, and a semi-tubular edging strip slidably secured to the exterior face of the jamb wall and having one end thereof substantially in abutting relation to the adjacent inset shoulder of the bracket body section with the adjacent end portion of said edging strip telescoped over the tongue section of said hinge bracket.

16. A door supporting assembly including in combination, a hinge bracket and a frame structure supporting the hinge bracket in cantilever suspension, said hinge bracket having a body section, a door supporting arm projecting from the front face of said body section at one end thereof, an anchor section projecting from the rear face of said body section, the rear face of said body section and the rear end face of said supporting arm together presenting a substantially coplanar seating surface in substantially surrounding relation to the base of said anchor section, a nose extension projecting from one end of said anchor section, said nose extension presenting a depressed abutment face rearwardly offset from the adjacent seating surface of the bracket and which together define a locking slot therebetween, and a tongue section projecting from the opposite end of said body section, said body section presenting an inset front shoulder adjacent the base of said tongue section, said frame structure presenting a jamb wall having an opening formed therein into which the anchor section of said hinge bracket projects, said jamb wall presenting a wall portion adjacent said opening which telescopes into said locking slot and exterior face portions adjacent said opening providing a seat for the seating surface of the hinge bracket, a first semi-tubular edging strip slidably secured to the exterior face of the jamb wall and having one end thereof substantially in abutting relation to the adjacent inset shoulder of the bracket body section with the adjacent end portion of said edging strips telescoped over the tongue section of said hinge bracket, and a second edging strip secured to said frame structure and extending substantially at right angles to said first edging strip, one end of said edging strip being positioned in substantially abutting relation to the rear face of said supporting arm, the outer face of said supporting arm and the front face of said bracket body section being respectively contoured in substantial conformity with the outer surface contour of the adjacent abutting edging strips.

17. An integrally formed hinge bracket which includes, a body section, a door supporting arm projecting from one side of said body section, an anchor section projecting from the opposite side of said body section, said body section having a relatively flat seating surface adjacent the base of said anchor section, and a tongue section projecting from an end of said body section, the base end of said tongue section having a cross sectional area less than the cross sectional area of the adjacent end of said body section whereby said body section presents inset shoulders on both sides thereof adjacent the base end of said tongue section.

18. An integrally formed hinge bracket which includes, a body section, a door supporting arm projecting from one side of said body section, an anchor section projecting from the opposite side of said body section, said body section having a relatively flat seating surface adjacent the base of said anchor section, and a tongue section projecting from each end of said body section, the base end of each tongue section having a cross sectional area less than the cross sectional area of the adjacent end of said body section whereby said body section presents inset shoulders on both sides thereof adjacent the base end of each tongue section.

19. An integrally formed hinge bracket which includes, a body section, a door supporting arm projecting from one side of said body section, an anchor section projecting from the opposite side of said body section, said body section having a relatively flat seating surface adjacent the base of said anchor section, a first tongue section projecting longitudinally from one end of said body section, the base end of said first tongue section having a cross sectional area less than the cross sectional area of the adjacent end of said body section whereby said body section presents inset shoulders on both sides thereof adjacent the base end of said first tongue section, and a second tongue section at the other end of the body section projecting at substantially a right angle from said opposite side thereof.

20. A door supporting assembly including in combination, a hinge bracket and a frame structure supporting the hinge bracket in cantilever suspension, said hinge bracket having a body section, a door supporting arm projecting from the front side of said body section, an anchor section projecting from the rear side of said body section, said body section presenting a seating face adjacent the base of said anchor section, and a tongue section projecting longitudinally from at least one end of said body section, said frame structure presenting a jamb wall having an opening formed therein into which the anchor section of said hinge bracket projects, said jamb wall presenting exterior face portions adjacent said opening providing a seat for the seating face of the bracket body section, and a semi-tubular edging strip slidably secured to the exterior face of the jamb wall and having an end portion thereof telescoped over the tongue section of said hinge bracket, the front side of the body section of the hinge bracket being substantially flush with the exterior face of said edging strip.

21. A door supporting assembly including in combination, a hinge bracket and a frame structure supporting the hinge bracket in cantilever suspension, said hinge bracket having a body section, a door supporting arm projecting from the front side of said body section, an anchor section projecting from the rear side of said body section, said body section presenting a seating face adjacent the base of said anchor section, and a tongue section projecting from each end of said body section, said frame structure presenting a jamb wall having an opening formed therein into which the anchor section of said hinge bracket projects, said jamb wall presenting exterior face portions adjacent said opening providing a seat for the seating face of the bracket body section, and a pair of semi-tubular edging strips each slidably secured to an exterior face of said frame structure and extending from the opposite ends of the body section of the bracket, each of said edging strips having an end portion thereof telescoped over the adjacent tongue section of said hinge bracket, the front side of the body section of the hinge bracket being substantially flush with the exterior face of at least one of said edging strips.

22. A door supporting assembly including a combination, a hinge bracket and a frame structure supporting the hinge bracket in cantilever suspension, said hinge bracket having a body section presenting a contoured front face and a flat rear face, a door supporting arm projecting from the front face of said body section, an anchor section projecting from the rear face of said body section, said body section presenting a seating face adjacent the base of said anchor section, and a tongue section projecting longitudinally from each end of said body section, said body section presenting an inset shoulder adjacent the base of each tongue section, said frame structure presenting a jamb wall having an opening formed therein into which the anchor section of said hinge bracket projects, said jamb wall presenting exterior face portions adjacent said opening providing a seat for the seating face of the bracket body section, and two semi-tubular edging strips slidably secured to the exterior face of the jamb wall, each of said semi-tubular edging strips having one end thereof substantially in abutting relation to the adjacent shoulder of the body section and the adjacent end portion thereof telescoped over the adjacent tongue section of said hinge bracket.

23. A door supporting assembly including in combination, a hinge bracket and a frame structure supporting the hinge bracket in cantilever suspension, said hinge bracket having a body section presenting a contoured front face and a flat rear face, a door supporting arm projecting from the front face of said body section, an anchor section projecting from the rear face of said body section, said body section presenting a seating face adjacent the base of said anchor section, a first tongue section projecting longitudinally from one end of said body section, and a second tongue section projecting from the rear face of the body section adjacent the other end thereof, said body section presenting an insert shoulder adjacent the base of said first tongue section, said frame structure presenting a horizontal edge and an adjacent vertical edge having an opening formed therein into which the anchor section of said hinge bracket projects, said vertical edge presenting exterior face portions adjacent said opening providing a seat for the seating face to the bracket body section, a first semi-tubular edging strip slidably secured to the exterior face of said vertical edge and having one end thereof substantially in abutting relation to the adjacent shoulder of the bracket body section and the adjacent end portion thereof telescoped over said first tongue section of the hinge bracket, and a second semi-tubular edging strip slidably secured to the horizontal edge of the frame structure and having one end thereof substantially in abutting relation to the flat rear face of the bracket body section and the adjacent end portion thereof telescoped over said second tongue section.

References Cited in the file of this patent

UNITED STATES PATENTS

| 2,747,238 | Jones et al. | May 29, 1956 |
| 2,776,029 | Hult | Jan. 1, 1957 |

FOREIGN PATENTS

| 611,124 | France | Sept. 21, 1926 |

UNITED STATES PATENT OFFICE
CERTIFICATE OF CORRECTION

Patent No. 2,876,874                                                         March 10, 1959

Kent W. Benham

It is hereby certified that error appears in the printed specification of the above numbered patent requiring correction and that the said Letters Patent should read as corrected below.

Column 7, line 71, for "contour is" read -- contour in --; column 8, Line 4, for "adjustable" read -- adjustably --.

Signed and sealed 7th day of July 1959.

(SEAL)
Attest:

KARL H. AXLINE

Attesting Officer

ROBERT C. WATSON
Commissioner of Patents